Patented Dec. 21, 1943

2,337,523

UNITED STATES PATENT OFFICE 2,337,523

PLASTIC MATERIAL AND FILLER THEREFOR

James H. Lum, Dayton, Ohio, assignor to Monsanto Chemical Company, a corporation of Delaware No Drawing. Application January 21, 1941, Serial No. 375,269

6 Claims. (Cl. 260—38)

This invention relates to new and improved plastic materials.

It is an object of this invention to provide new and improved plastic compositions particularly suitable for molding purposes.

It is a further object of this invention to provide a plastic molding material of increased flowability.

A still further object is to provide a new and useful filler for plastic masses.

According to the present invention it has been found that wood of the tropical tree known as Manilkara or Minusops is particularly suited, when prepared in the form of a flour, for incorporation into plastic compositions of various types. Included within the scope of the plastic materials contemplated herein are such basic plastic materials as phenol-formaldehyde resins, urea aldehyde resins, vinyl resins, alkyd resins, cellulose derivatives and the like.

Plastic molding powders containing my improved filler may be produced by incorporating with the base plastic material a wood flour prepared from wood of the Manilkara species and particularly good results may be obtained by the use of the wood of the massaranduba tree. For satisfactory incorporation into a plastic composition I may reduce the wood to flour form in known manner, that is, by grinding as by attrition or by other reduction methods, to the point where the flour passes a 100 mesh screen. Due to the ready wettability of the flour by the resin it is possible to incorporate into plastic bodies flours having a substantially coarser particle size than that customarily used. In fact, I have successfully employed wood flours having a particle size such that the material substantially all passed a 60 mesh screen. For the purpose of obtaining high impact strength, I may advantageously employ the coarser sizes of flour, without encountering difficulty due to restricted flow, impaired finish and poor water resistance.

Due to the high flowability of the plastic resin composition incorporating my improved filler, I find it possible to substantially decrease the proportion of resin without sacrifice of desirable properties. It is also possible by virtue of the fact that the plastic composition including my improved filler has greater flowability to employ it in the molding of large objects.

As stated above, the type of wood preferably employed is that known as Manilkara or Minusops which two names are substantially synonymous as used by botanists. A well known member of this species of tree is the massaranduba which is found principally in the lower Amazon region of Brazil, where it grows to a very large size. While the tree occurs both in tropical America and tropical Europe, the woods of the American species are similar in structure. The heartwood is red or reddish brown, deepening upon exposure, with oily appearance and feel in some West Indian species, distinct but usually not sharply demarcated from the whitish sapwood. The luster is low. It is without pronounced odor or taste. Generally extremely hard, heavy and strong, its specific gravity as air dried is 0.9–1.2 and it weighs from 56–75 pounds per cu. ft. It is easy to moderately difficult to work, finishes very smoothly and is highly durable for the usual purposes.

The wood of this species is described as follows:

"Growth rings sometimes distinct due to narrow pore-less zones. Pores small to very small, fairly numerous; mostly in small multiples arranged in radial or oblique series frequently visible without lens. Tyloses abundant; intervascular pitting rather fine. Rays 1 or 2, infrequently 3, cells wide and up to 30 cells high; decidedly heterogeneous; gum deposits abundant in heartwood; disjunctive cells present; pits to vessels in part rather large, rounded to much elongated. Wood parenchyma in numerous, narrow, uniform to very irregular, evenly to unevenly spaced concentric bands; sometimes with local tendencies to be coarsely reticulate; crystals common. Wood fibers with very thick walls and very small cavities."

The following examples illustrate my invention, giving first, as illustrative, a resin composition employing a standard white pine wood flour.

Example I

| | Parts |
|---|---|
| Phenol-formaldehyde resin compound | 47.5 |
| White pine wood flour (−100 mesh) | 47.5 |
| Burnt umber | 5 |

This molding powder mixture is intimately incorporated in the ball mill, then rolled employing a front roll temperature of 210° F., back roll temperature of 290° F., for a time of one minute. This composition upon testing in the Olsen-Bakelite flow tester at 150° C., 700 lbs. per sq. in. showed a flow of 0.35 inch. The curing time was 36 seconds, the finish good, water absorption 0.69%, shrinkage was 0.0067 inch per inch and impact value 0.151 foot pound. The specific gravity of the molded piece was 1.36, while the bulk density of the molding powder was 54 grams per 100 cc.

The phenol-formaldehyde resin compound employed in this example consisted of a typical thermo-setting two-stage molding resin in the "A" stage, hexamethylene tetra-amine, hydrated lime, and a lubricant.

*Example II*

A molding powder composition was made of the following ingredients:

| | Parts |
|---|---|
| Phenol-formaldehyde resin compound (same as in Example I) | 47.5 |
| Massaranduba wood flour (−60 mesh) | 47.5 |
| Burnt umber | 5 |

This mixture was ball milled as in Example I above, then rolled at the same temperature as above but for a period of two minutes instead of one minute.

Upon testing in the Olsen-Bakelite flow tester I obtained a flow of 1.1 inches at 150° C. and 500 pounds. Had I employed 700 pounds for this test the flow would have exceeded the capacity of the flow tester. The cure of this molding compound was 39 seconds, the finish good despite the coarser flour, and the water absorption only 0.46%. The shrinkage was 0.0064 inch per inch, while the impact value was 0.170 foot pound. The specific gravity of the molded piece was 1.37, while the bulk density of the molding powder was 60 grams per 100 cc.

The above example, in comparison with Example I, illustrates the greatly increased flow which I may obtain by the use of my improved filler without sacrifice of water absorption value, speed of cure, or finish and with a considerably improved impact value over that shown by prior known materials. This advantage is also gained without increase in the specific gravity of the molded piece and for ease of handling the powder has a fairly high bulk density.

Due to the great increase in flow produced by my improved filler I may advantageously decrease the percentage of resin in the molding powder without sacrificing desirable properties. This is illustrated by the following example.

*Example III*

A molding powder composition was prepared containing the following ingredients:

| | Parts |
|---|---|
| Phenol-formaldehyde resin compound (same as Example I) | 42.5 |
| Massaranduba wood flour (−60 mesh) | 52.5 |
| Burnt umber | .5 |

This mixture was incorporated in the ball mill, rolled at the temperature given above for a period of only one minute, and when tested in the Olsen-Bakelite flow tester I obtained a flow of 0.50 inch at 150° C. and 700 pounds. The cure was obtained in 34 seconds, the finish was good, water absorption was 0.73%, the shrinkage value was 0.0057 inch per inch and the impact value was 0.194 ft. pound.

A reduction in the phenol-formaldehyde content equivalent to that illustrated in Example III would be impractical for most commercial applications were a white pine wood flour to be employed. However, using my Manilkara wood flour I find such a decreased resin content to be entirely practical without sacrificing desirable properties.

The preceding examples are given by way of illustration only and it will be obvious that I may incorporate with my improved filler any of the ordinary or usual type fillers which are known to the art with advantageous results imparted to the composition. Thus I may incorporate with my Manilkara wood flour, fillers such white pine flour, mica, shale, barite, chalk, asbestos, kaolin, iron oxide, cotton floc, cellulose, etc.

What I claim is:

1. A plastic thermosetting composition comprising a heat reactive phenol-form aldehyde resin and massaranduba wood flour for at least a portion of the filler.

2. A molding powder composition comprising the following ingredients:

| | Parts |
|---|---|
| Phenol-formaldehyde resin compound | 47.5 |
| Massaranduba wood flour | 47.5 |

3. A molding powder composition comprising the following ingredients:

| | Parts |
|---|---|
| Phenol-formaldehyde resin compound | 42.5 |
| Massaranduba wood flour | 52.5 |

4. A plastic thermosetting composition comprising a heat reactive phenol-formaldehyde resin and Manilkara wood flour for at least a portion of the filler.

5. The process of making a plastic thermosetting composition which comprises adding to a heat reactive phenol-formaldehyde resin, wood flour of the genus: Manilkara.

6. The process of making a plastic thermosetting composition which comprises adding to a heat reactive phenol-formaldehyde resin, wood flour of the species: massaranduba.

JAMES H. LUM.